United States Patent
Diehl et al.

(10) Patent No.: US 7,752,879 B2
(45) Date of Patent: Jul. 13, 2010

(54) METHOD AND DEVICE FOR MOUNTING A FASTENING ELEMENT ON A PART, PARTICULARLY A SHEET METAL PART

(75) Inventors: Oliver Diehl, Bad Homburg (DE); Richard Humpert, Rosbach (DE)

(73) Assignee: Profil Verbindungstechnik GmbH & Co., KG, Friedrichsdorf (DE)

( * ) Notice: Subject to any disclaimer, the term of this patent is extended or adjusted under 35 U.S.C. 154(b) by 599 days.

(21) Appl. No.: 11/568,253
(22) PCT Filed: Apr. 28, 2005
(86) PCT No.: PCT/EP2005/004588

§ 371 (c)(1),
(2), (4) Date: Feb. 13, 2007

(87) PCT Pub. No.: WO2005/105364

PCT Pub. Date: Nov. 10, 2005

(65) Prior Publication Data

US 2009/0113972 A1    May 7, 2009

(30) Foreign Application Priority Data

Apr. 28, 2004   (DE) .................. 10 2004 020 676

(51) Int. Cl.
*B21J 15/12*   (2006.01)
*B23P 11/00*   (2006.01)

(52) U.S. Cl. ................ 72/114; 72/67; 29/509
(58) Field of Classification Search ............. 72/112, 72/114, 126, 67; 29/525.13, 432.1, 524.1, 29/525.01, 525.02, 525.06–525.07, 798, 29/243.53, 509, 520, 515

See application file for complete search history.

(56) References Cited

U.S. PATENT DOCUMENTS 4,555,838 A * 12/1985 Muller .................. 29/432.1

(Continued)

FOREIGN PATENT DOCUMENTS

DE    13 00 800 B    8/1969

(Continued)

OTHER PUBLICATIONS

International Search Report for PCT/EP2005/004588 dated Jul. 18, 2005.

(Continued)

*Primary Examiner*—Dana Ross
*Assistant Examiner*—Mohammad Yusuf
(74) *Attorney, Agent, or Firm*—Herskovitz & Associates LLC; Abraham Hershkovitz; Eugene C. Rzucidlo

(57) ABSTRACT

Disclosed are a method and a device for mounting a fastening element (12, 12') on a part, e.g. a sheet metal part (13, 13'). Said fastening element comprises an axis of symmetry (18), a head piece (14) with a contact surface (22) that comes in contact with the part (13), a fastening section encompassing a thread (15, 15'), and at least one undercut (24, 82) which accommodates the material of the part. The material of the part is pressed against the contact surface and into the undercut by means of a first tool (26-26''') which is provided with a female die that is suitable for embodying the fastening element. The inventive method and device are characterized in that a local force (K) is applied to the head piece (14) of the fastening element (12, 12') or to the tool (26-26''') at the side of the axis of symmetry (18) and moves in a circular manner around said axis of symmetry (arrow 43) while performing a relative advancing movement (arrow 28) between the tool (26-26''') and the fastening element (12, 12'), between which the part (13, 13') is positioned, in order to press the material of the part into the undercut (24, 82).

7 Claims, 8 Drawing Sheets

U.S. PATENT DOCUMENTS

Figure 1A:
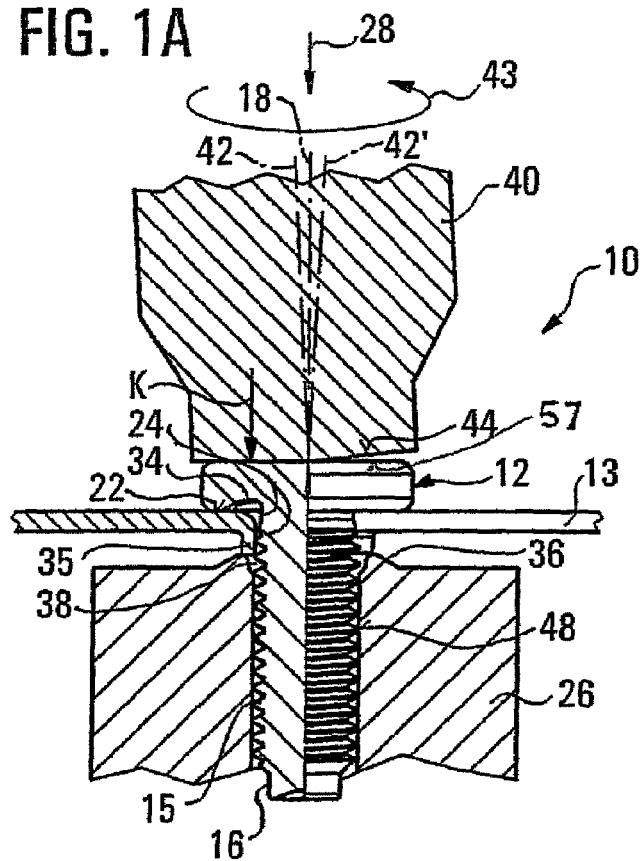

| | | | | | |
|---|---|---|---|---|---|
| 4,633,560 | A | * | 1/1987 | Muller | 29/798 |
| 4,727,610 | A | * | 3/1988 | Lin | 7/160 |
| 4,974,274 | A | * | 12/1990 | Compton et al. | 470/11 |
| 5,502,888 | A | * | 4/1996 | Takahashi et al. | 29/798 |
| 5,613,815 | A | * | 3/1997 | Muller | 411/181 |
| 5,634,674 | A | | 6/1997 | Fuser | |
| 6,125,524 | A | | 10/2000 | Mueller | 29/520 |
| 6,763,568 | B1 | * | 7/2004 | Mauermann et al. | 29/798 |
| 7,401,394 | B1 | * | 7/2008 | Muller | 29/509 |
| 7,480,971 | B2 | * | 1/2009 | Oliver et al. | 411/180 |
| 2006/0137166 | A1 | * | 6/2006 | Babej et al. | 29/509 |

FOREIGN PATENT DOCUMENTS

| | | |
|---|---|---|
| DE | 35 07 489 A1 | 4/1986 |
| DE | 195 35 537 A1 | 3/1997 |
| DE | PCT/DE98/02225 | 8/1998 |
| DE | 199 27 103 A1 | 12/2000 |
| DE | 100 32 816 A1 | 1/2002 |
| DE | 101 02 712 A1 | 8/2002 |
| DE | 102 58 928 A1 | 7/2004 |
| EP | 0 759 510 B1 | 8/1996 |
| EP | 0 678 679 B1 | 6/1998 |
| EP | 0 957 273 B1 | 6/2003 |
| EP | 0 958 100 B1 | 11/2003 |
| SE | 521 812 | 9/2003 |

OTHER PUBLICATIONS

German search report relating to German Patent Application No. 10 2004 020 676.7 dated Nov. 29, 2004.

English Language translation of German search report relating to German Patent Application No. 10 2004 020 676.7 dated Nov. 29, 2004.

* cited by examiner

METHOD AND DEVICE FOR MOUNTING A FASTENING ELEMENT ON A PART, PARTICULARLY A SHEET METAL PART

The present invention relates to a method for the attachment of a fastener element to a component, for example a sheet metal part, wherein the fastener element has an axis of symmetry, a head part having a contact surface which enters into contact with the component, a fastening section having a thread and also at least one undercut which receives the material of the component, and wherein the material of the component is pressed against the contact surface and into the undercut by means of a first tool having a die button shape matching the design of the fastener element.

A method and an apparatus of the initially named kind are extremely well-known in the field of attachment of the fastener elements to sheet metal parts. For example the European patents 0 678 679 and 0 958 100 describe how a fastener element which is available in commerce under the designation EBF from the company Profil Verbindungstechnik GmbH & Co. KG can be attached to a sheet metal part. Furthermore, the European patents 0 759 510 and 0 957 273 describe how variants of the so-called RSN nut elements of the company Profil Verbindungstechnik GmbH & Co. KG can be attached to sheet metal parts. The above-described elements are frequently termed press-in elements because they do not have any rivet section which has to be beaded over.

In order to carry out the previously known methods presses with considerable pressing forces are mainly used which take care of the attachment of the fastener element to the sheet metal parts and indeed in particular when the sheet metal part is also to be given a specific shape in the press.

Not only elements of the company Profil Verbindungstechnik GmbH & Co. KG are attached to sheet metal parts in this way and means but rather also a series of further fastener elements from other competitors. It is also known, instead of using a press for the attachment of the fastener elements, to secure these in C-frames and/or by means of robots to sheet metal parts and in both cases corresponding force-generating devices must be present which often have to produce forces in tons in two figures.

Using such apparatuses the fastener elements are attached in one stroke to the sheet metal part, the process thus takes place relatively quickly.

There are, however, a large number of possible applications in smaller and larger workshops, for example for the manufacture of smaller series when no heavy presses or the other named devices (C-frames or robots) are available, either because the corresponding companies do not have such devices or because these are otherwise fully employed.

It is thus the object of the present invention to propose reliable methods and apparatus which are able to attach fastener elements of the initially named kind to sheet metal parts without considerable forces being required for this, so that companies are also in a position, even without high investments in relatively heavy equipment, to attach fastener elements to components, in particular to sheet metal parts reliably, and with the method of the invention and the apparatus in accordance with the invention being able to be used for a large number of different fastener elements.

Although the invention is primarily intended for use with sheet metal parts there are also other components such as components of plastic or in the form of laminates or cast parts of ductile materials which can be processed by means of the present invention.

In order to satisfy this object a method of the initially named kind is provided which is characterized in that a local force is exerted on the head part of the fastener element or onto the tool to the side of the axis of symmetry and is moved circularly around the axis of symmetry while simultaneously carrying out a relative feed movement between the tool and the fastener element between which the component is arranged in order to press the material of the component into the undercut.

The fastener element can be a bolt element, for example an EBF element, with the thread being formed on a shaft part of the fastener element and with the shaft part being guided through a pre-holed component prior to the exertion of the local force for the movement of the material of the component into the undercut.

Alternatively the fastener element can be a nut element, for example an RSU element, with the thread being formed as a threaded bore of the fastener element and optionally being arranged in the head part, and the method is carried out with a holed component or an unholed component, which is in principle also possible with a bolt element. It should be pointed out that with a nut element which is guided through a pre-holed component the thread can only be cut subsequently, i.e. an originally smooth bore of the nut element is only made into a thread after the attachment of the element to the component, by the use of a thread forming or thread cutting screw.

In accordance with the invention, instead of using a large rapidly acting force a substantially lower force is used which acts locally on the fastener element and/or on the component, and indeed over a comparatively long time (which can however straight forwardly lie in the range of seconds), with the force being moved progressively about the axis of symmetry of the fastener element and acting locally on the fastener element or on the sheet metal part until the attachment, i.e. the hooking of the material of the component to the fastener element or to the undercut or undercuts that is or are provided is completed. Since the force that is used is significantly smaller than the forces previously used the apparatus required to carry out the method is substantially less loaded and can accordingly be made lighter and more compact and requires less material than was previously necessary.

Furthermore, on carrying out the method, it is possible to operate with die buttons which are identical to the die buttons previously used for the corresponding elements, or which have only been insignificantly modified so that proven systems which have been tested in practice can also continue to be used with the new method and with the new apparatus.

Particularly preferred variants of the method of the invention and also of the corresponding apparatuses can be seen from the patent claims and also from the further description.

Figure 1B:
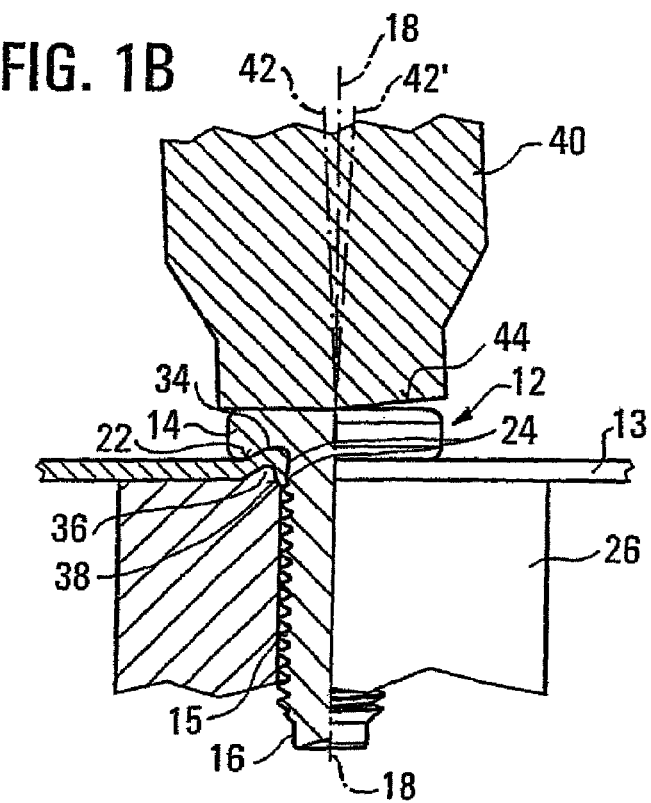
Figure 2A:
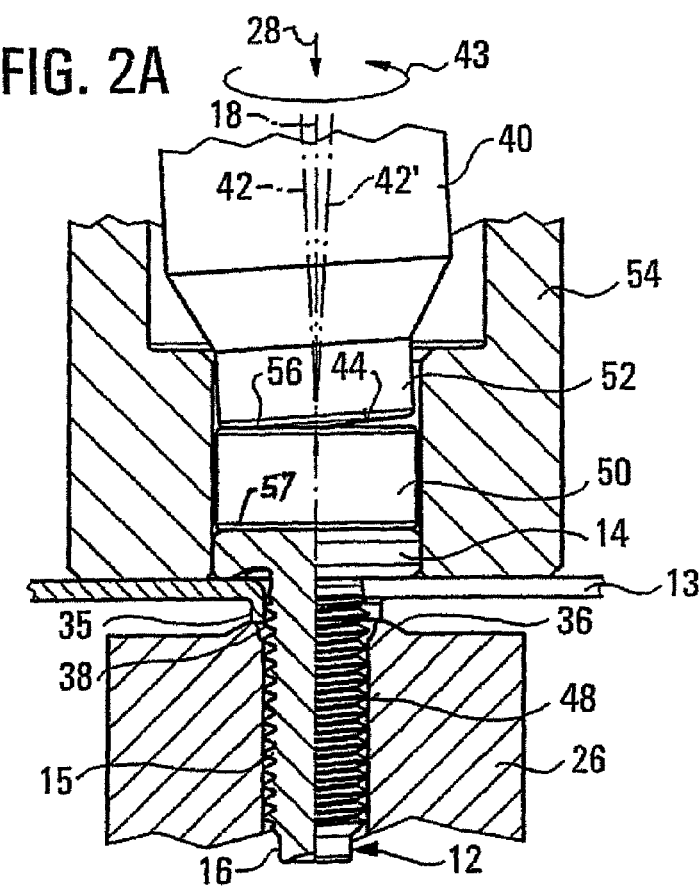
Figure 2B:
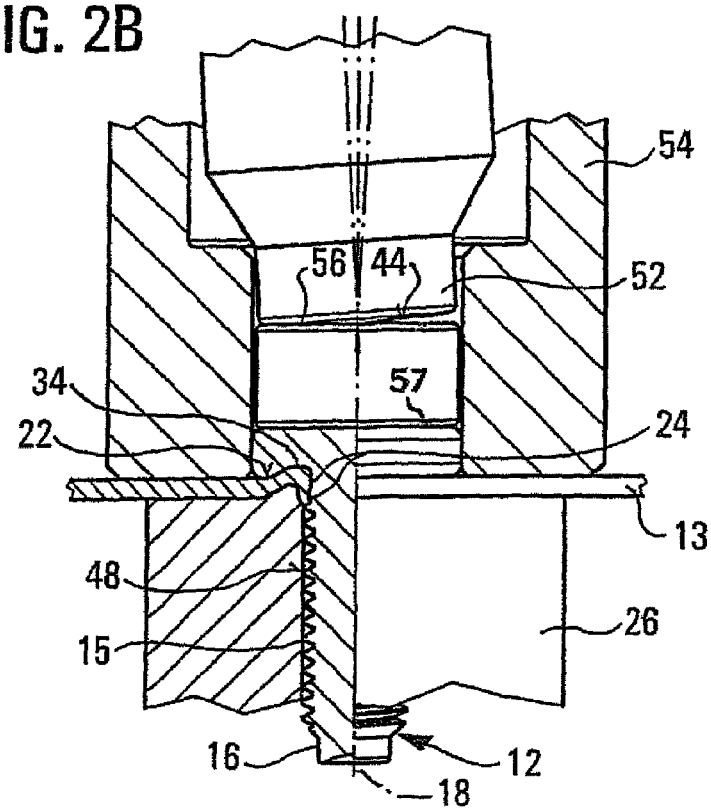
Figure 3A:
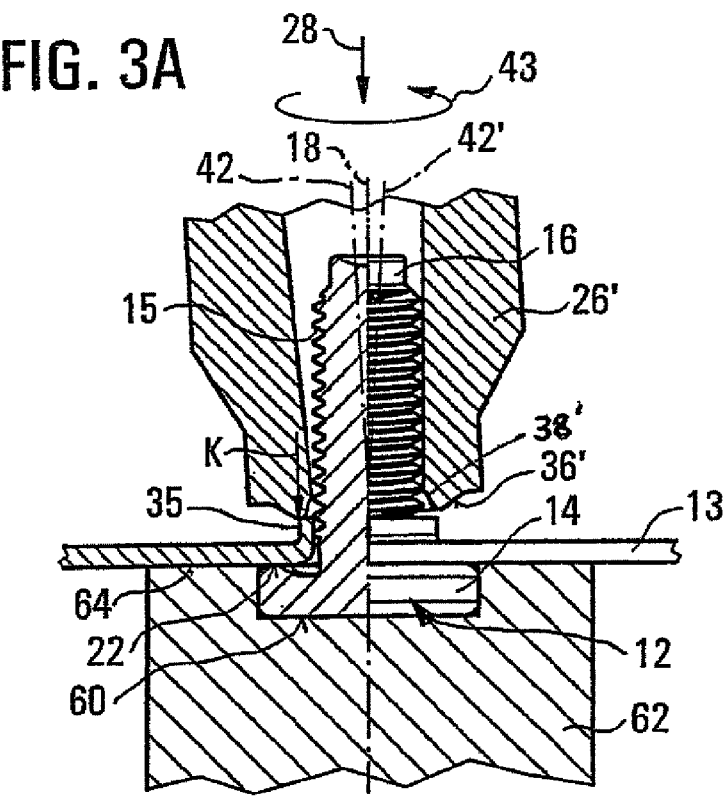
Figure 3B:
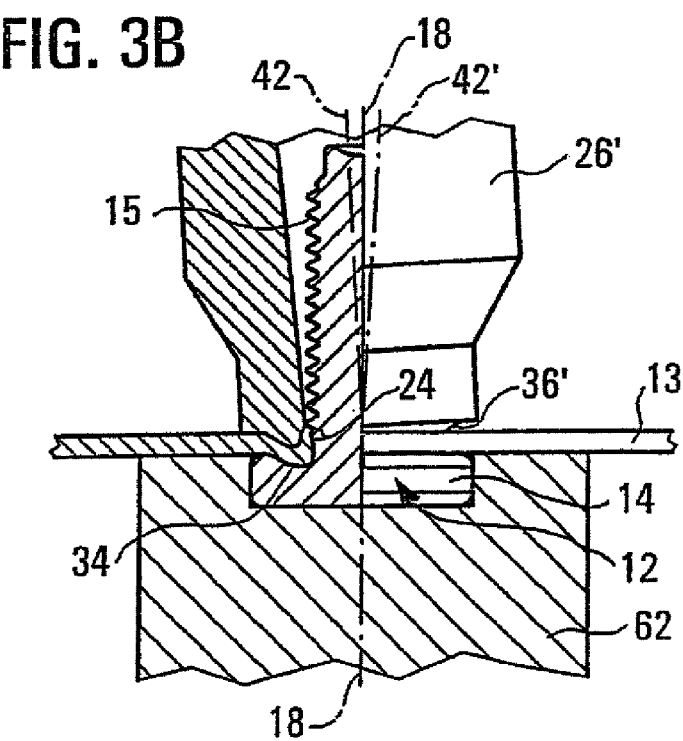
Figure 4A:
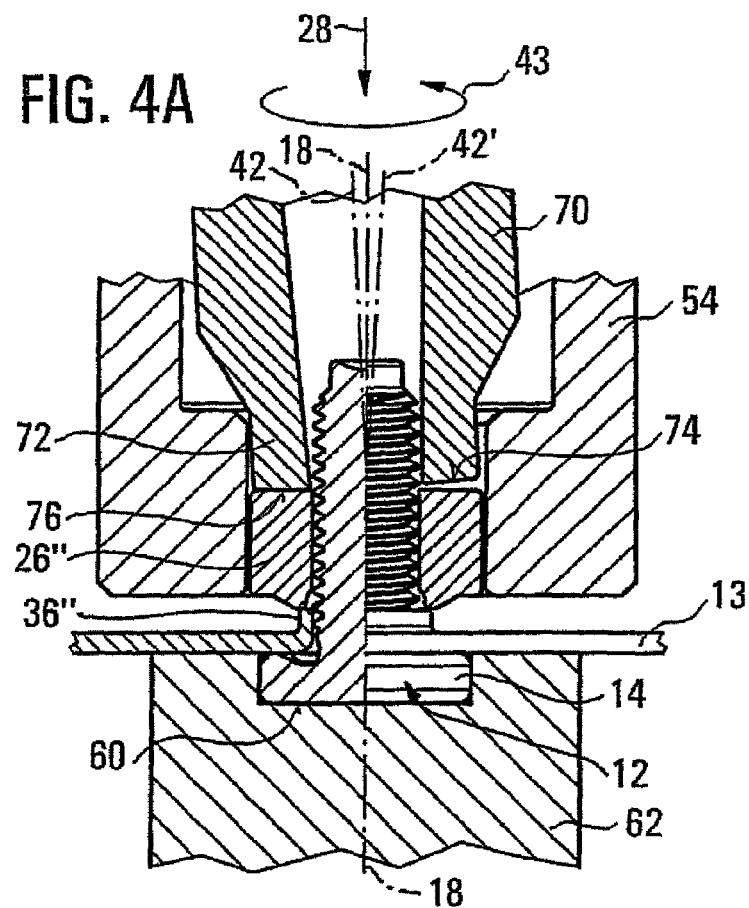
Figure 4B:
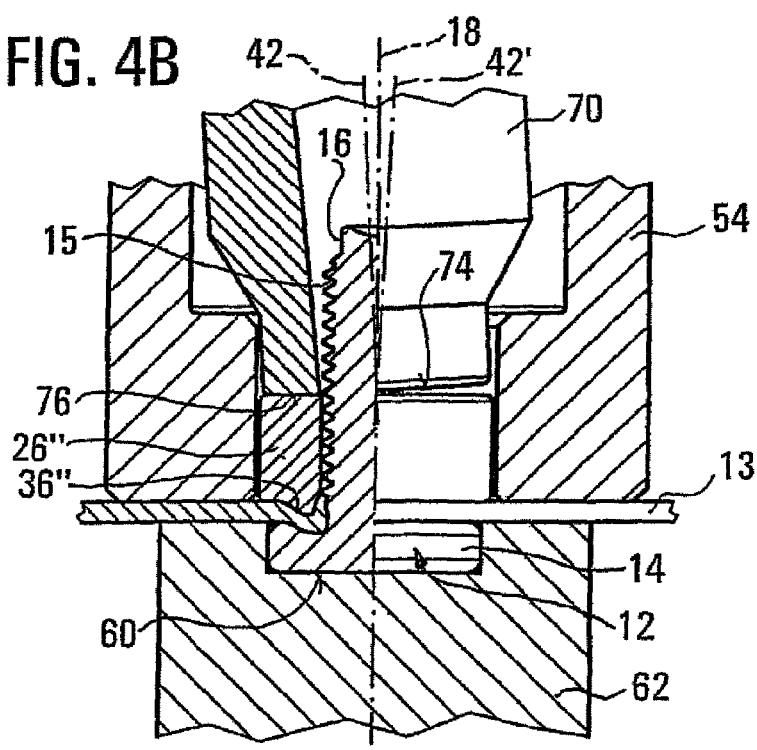
Figure 5A:
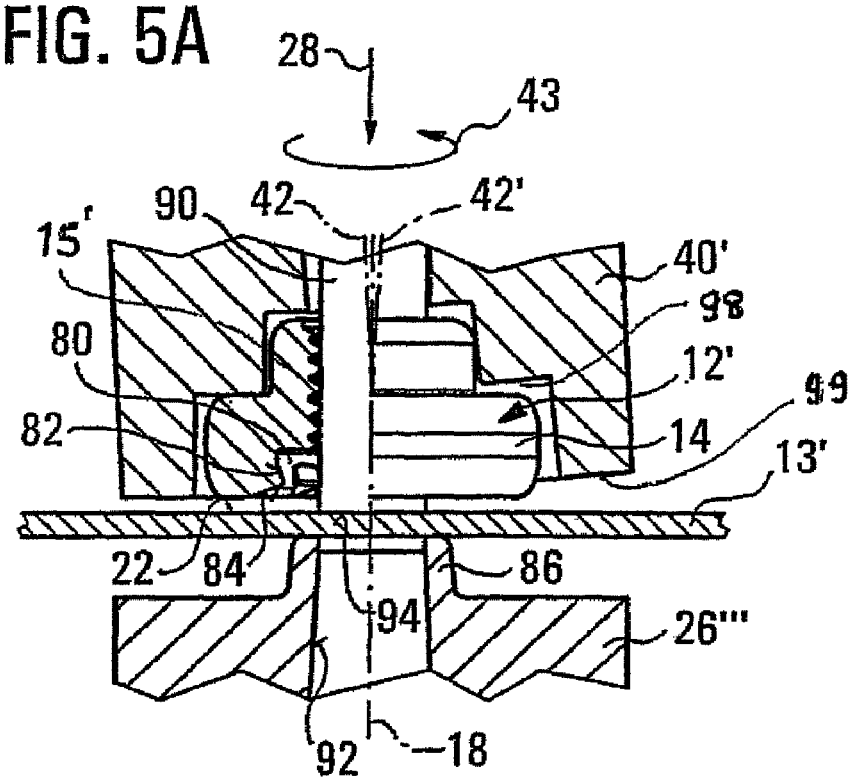
Figure 5B:
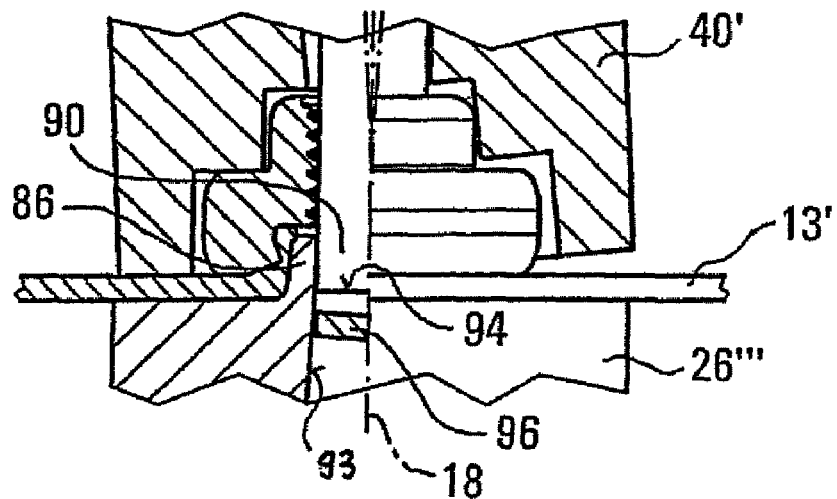
Figure 6A:
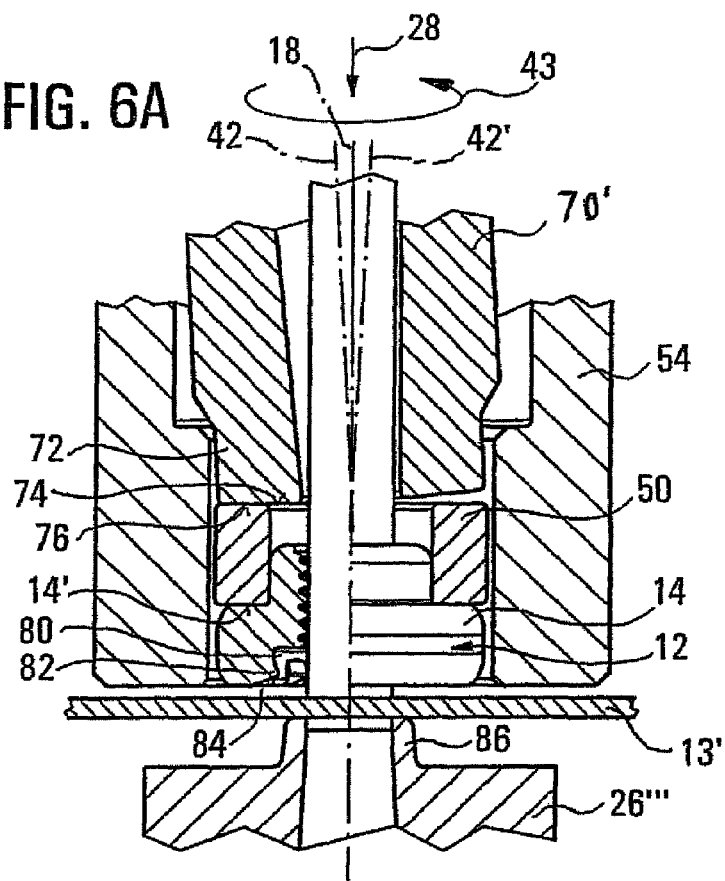
Figure 6B:
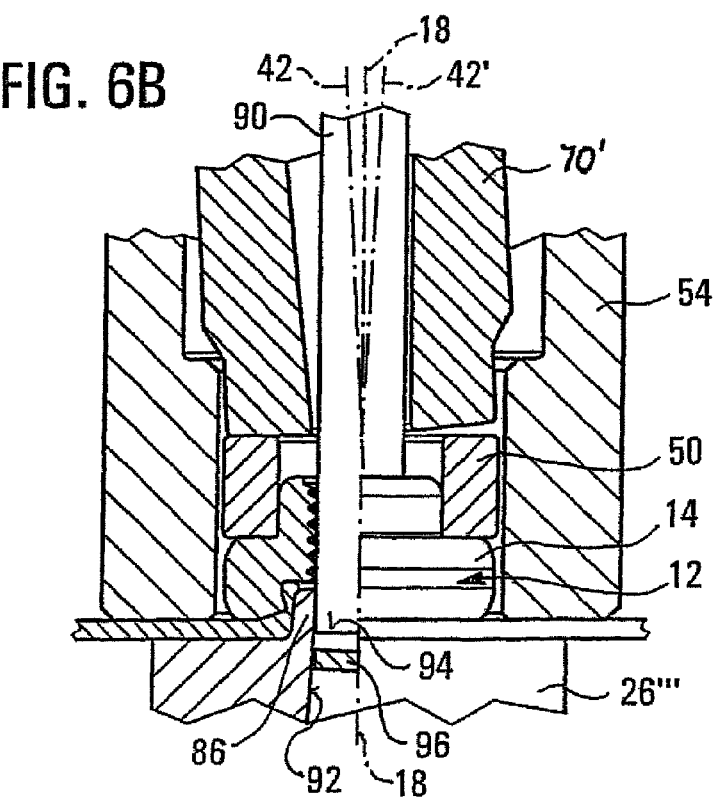
Figure 7A:
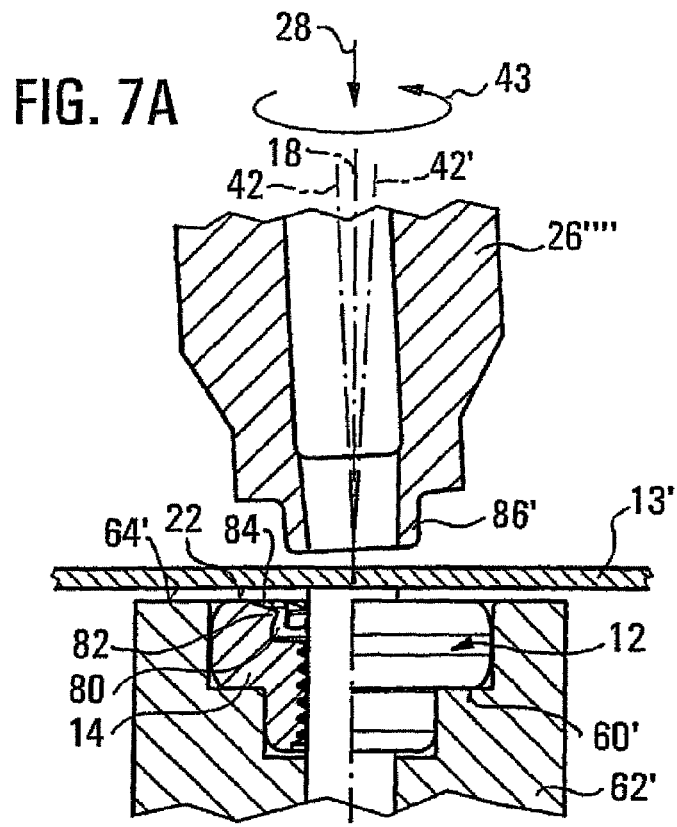
Figure 7B:
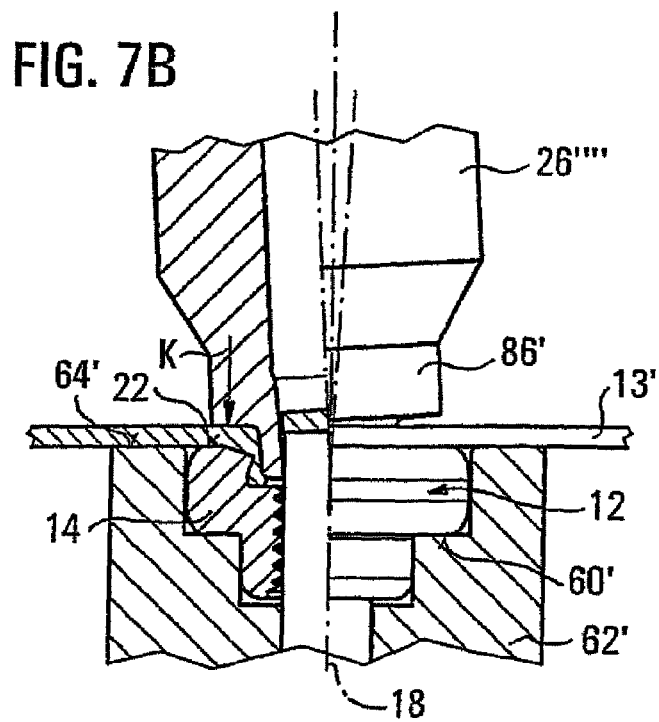
Figure 8A:
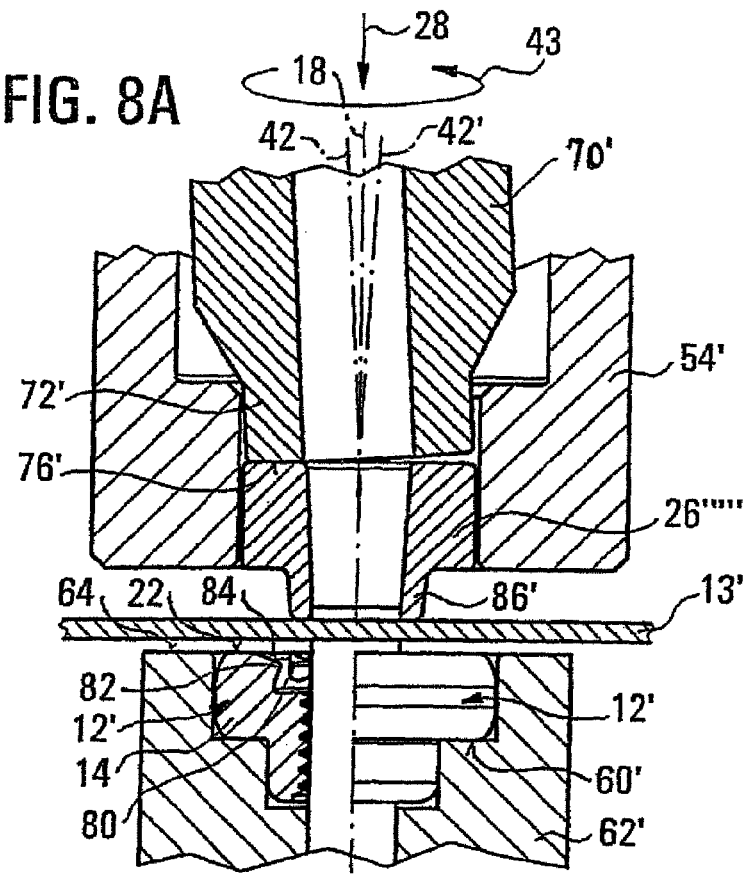
Figure 8B:
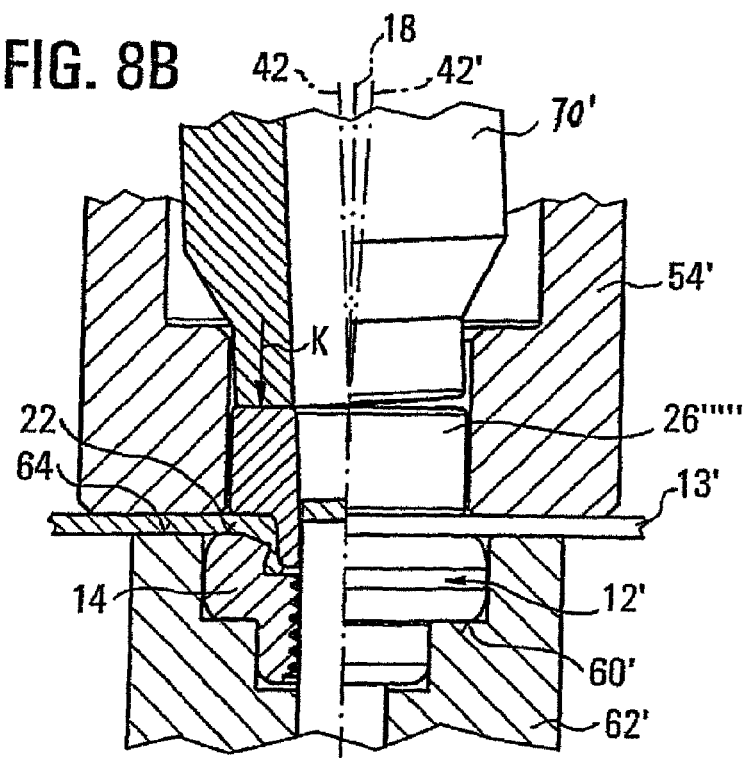

The invention will subsequently be explained in more detail in the following with reference to the drawing and with reference to embodiments In the drawing:

FIGS. 1A shows a first embodiment in accordance with the invention of the attachment of a bolt element known per se to a sheet metal part immediately prior to the start of the reshaping of the sheet metal part, FIG. 1B shows an illustration in accordance with FIG. 1A however just at the end of the shaping of the sheet metal part, FIGS. 2A and 2B shows Figures corresponding to FIGS. 1A and 1B but of a variant of the method of the invention and of the apparatus of the invention, FIGS. 3A and 3B shows Figures corresponding to FIGS. 1A and 1B but of a further variant of the method of the invention and of the apparatus of the invention, FIGS. 4A and 4B shows Figures corresponding to FIGS. 1A and 1B but of another variant of the method of the invention and of the apparatus of the invention, FIG. 5A shows a first embodiment in accordance with the invention of the attachment of a nut element known per se to a sheet metal part just before the start of the reshaping of the sheet metal part, FIG. 5B shows an illustration corresponding to FIG. 5A but just at the end of the reshaping of the sheet metal part, FIGS. 6A and 6B shows Figures corresponding to FIGS. 5A and 5B but of a variant of the method of the invention and of the apparatus of the invention, FIGS. 7A and 7B shows Figures corresponding to FIGS. 5A and 5B but of a further variant of the method of the invention and of the apparatus of the invention, and FIGS. 8A and 8B shows Figures corresponding to FIGS. 1A and 1B but of another variant of the method of the invention and of the apparatus of the invention.

Referring to FIGS. 1A and 1B an apparatus 10 is shown which is designed in order to carry out a method for the attachment of a fastener element 12 to a pre-holed plastically deformable component 13, for example to a sheet metal part. The fastener element has a head part 14 and a shaft part 16 having a thread which is arranged concentric to an axis of symmetry 18 of the fastener element and which merges via a contact surface 22 extending in the radial direction into the head part 14. The fastener element is in this specific case an EBF bolt element of the company Profil Verbindungstechnik GmbH & Co. KG, so that the fastener section, which enables the later attachment of a further component to the component assembly consisting of the bolt element and the first component by a nut screwed onto the shaft part 16, is realized here by a thread arranged concentric to the axis of symmetry. The fastener element illustrated here is to be understood as being representative for a large number of different elements and has, moreover, at least one undercut which receives the material of the component. As shown in FIG. 1B the material of the component 13 is pressed against the contact surface 22 and into the undercut 24 by means of a first tool 26 having a die button shape matched to the design of the fastener element, the tool here being a customary die button for EBF elements.

In accordance with the invention a local force K is exerted onto the head part 14 of the fastener element 12 to the side of the axis of symmetry 18. The position of this force is moved circularly around the axis of symmetry and at the same time a relative feed movement takes place in the direction of the arrow 28 between the tool 26 and the fastener element between which the component is arranged, in order to press the material of the component into the undercut 24.

The fastener element 12 has, in addition to the radial undercut 24, which can be formed by the thread 15 in the region of the head part, an axial ring groove 34 or concave fields in the contact surface 22. The shaft part 16 of the fastener element is passed through a ring collar 35 surrounding the hole of the pre-holed component 13 from the side of the component remote from the ring collar 35.

The die button 26 has a central ring projection 36 with an at least substantially conical inner surface 38 which presses the material of the ring collar 35 radially inwardly into the undercut 24, as can be seen from FIG. 1B. Furthermore, the ring projection presses the sheet metal material into the ring groove 34.

The local force K is exerted onto the head part 14 of the fastener element 12 with a second tool 40 which is arranged in an inclined position 42 related to the axis of symmetry 18 and is rotated about the axis of symmetry 18 (arrow 43). The second tool 40 has a conical end face 44 facing the head part 14 of the fastener element and operates in this example directly on the head part 14 of the fastener element 12.

The relative axial feed movement (arrow 28) between the die button 26 which receives the head part 14 and the tool 40 is carried out until the ring collar 35 has been completely beaded over and brought into contact with the fastener element 12 as is shown in FIG. 1B. Since the tool 40 is aligned with the inclined axis 42 and is rotated about the axis of symmetry 18 the inclined axis 42 continuously moves and can for example be found at 42' at a later point in time.

At any point in time during the re-shaping of the sheet metal part the die button projection 36 is in contact with the ring collar over only a comparatively small surface which progressively moves around the axis of symmetry 18 on rotation of the tool 40 and leads to a progressive local deformation of the ring collar. The simultaneously occurring feed movement in the arrow direction 28 leads, in combination with this rotary movement, to a progressive hooked engagement of the sheet metal material with the ring groove or the concave fields in the contact surface, i.e. in the corresponding side of the head part and also with the undercut, so that this hooking can be completed with only a few rotations of the tool 40 in total.

For carrying out this process an apparatus (not shown) similar to a pillar drilling machine or drill press can be used in which the die button 26 is mounted on the table of the pillar drill and the second tool 40 on the drilling head of the pillar drill, and indeed in a position corresponding to the oblique axis 42 which ensures the rotation about the axis of symmetry 18. The feed movement can take place by hand by manual feeding of the drilling head towards the table (as usual in a pillar drill) or by a drive which moves the table towards the drilling head or the drilling head towards the table. Naturally special apparatuses can also be provided which ensure the required movements. The sheet metal part can be positioned by hand or by a small robot onto the shaft part 16 of the bolt element and onto the die button, with the shaft part of the bolt element entering into a central bore 48 of the die button 40. The sheet metal part can be secured or clamped to the table or to a support (not shown) adjacent to or disposed surrounding the die button 26, providing the die button 26 is not itself used for this purpose, which is entirely possible.

During the re-shaping of the sheet metal any features providing security against rotation which are provided at the fastener element, for example in the region of the contact surface 22 and/or at the transition from the shaft part 16 into the contact surface 22 are brought into engagement with the component 13. Such features providing security against rotation can for example have the form of radial ribs which bridge the ring groove 34 and subdivide this into concave fields, as is the case with an EBF bolt.

In a further development of the method the second tool 40 can be rotated not only about the axis of symmetry 18 of the fastener element but rather simultaneously about the inclined axis 42 which is defined by the inclined position of the second tool. An additional rotary movement of this kind is indicated by the arrow 43 in FIG. 1A.

A further variant of the method and of the apparatus will now be described with reference to FIGS. 2A and 2B. In the description of FIGS. 2A and 2B the same reference numerals will be used for parts as were previously used for corresponding parts or parts having the same function in the embodiment of FIGS. 1A and 1B. It will be understood that the same description applies to these parts as to corresponding parts of the embodiment of FIGS. 1A and 1B, unless something to the contrary is expressed. This convention will also be used throughout the further description. When only small differences are present between corresponding parts, the parts will be identified by the same reference numerals but additionally supplemented with a prime, such as ', '', ''', '''' or '''''.

In this variant the second tool 40 operates via a cylindrical intermediate piece 50 on the head part 14 of the fastener element 12. The cylindrical intermediate piece 50 and a front section 52 of the second tool 40 facing the cylindrical intermediate piece are guided by a tubular guide part 54 with some radial clearance.

The end face 44 of the second tool 40 facing the head part 14 of the fastener element 12 has an at least substantially linear contact 56 with the intermediate piece 50.

Whereas the second tool 40 operates in the embodiment of FIGS. 1A and 1B on a ring surface 57 of the head part of the fastener element the cylindrical intermediate piece 50 does this in the embodiment of FIGS. 2A and 2B.

Any features providing security against rotation which are provided or formed on the fastener element, for example in the region of the contact surface and/or at the transition from the shaft part into the contact surface are also brought into engagement with the component 13 here during the re-shaping movement.

The possibility also exists here of rotating the second tool 40 not only about the axis of symmetry 18 of the fastener element but rather simultaneously also about the axis of inclination 42 which is defined by the inclined position of a second tool 40.

The design of the die button 26 and the reception of the shaft part 16 of the fastener element in the bore 48 of the die button are identical to the embodiment of FIGS. 1A and 1B and they will not be especially described here.

A third method in accordance with the invention and a third apparatus in accordance with the invention for the attachment of the fastener element, which has already been described in detail in connection with FIGS. 1A and 1B, are shown in FIGS. 3A and 3B. In the description of FIGS. 3A and 3B the same reference numerals will be used for parts as were previously used for corresponding parts or parts having the same function in the FIGS. 1A and 1B embodiment. It will be understood that the same description applies to these parts as to the corresponding parts of the embodiment of FIGS. 1A and 1B, unless something to the contrary is expressed.

As shown in FIG. 3A the head part 14 of the fastener element 12 is received in a cut-out 60 of a tool 62 the end face 64 of which supports the component 13 at least substantially at the level of the contact surface 22. The local force K is exerted onto the component 13, in particular onto its ring collar 35 via a tool 26' which has at its lower end face in FIG. 1A a shape corresponding to the end face of the die button 26 of the previous embodiments, with the shape of the ring projection 36' being able to be slightly eased, i.e. relieved relative to the ring projection 36 of the die button 26 of FIGS. 1A, 1B, and 2A, 2B in order to take account of the swashing movement of the tool 26'. As a result of these small differences the tool is designated with the reference numeral 26' and the ring projection with its inner surface with the reference numerals 36' and 38' respectively. The tool 26' is arranged in an inclined position related to the axis of symmetry 18 and is rotated in the arrow direction 43 about the axis of symmetry 18.

Here the first tool 26' operates directly on the component in the region of the fastener element.

During the re-shaping movement, any features providing security against rotation which are attached to the fastener element, for example in the region of the contact surface and/or at the transition from the shaft part into the contact surface are also brought into engagement with the component 13 here.

Here the possibility also exists of not only rotating the tool 26' about the axis of symmetry 18 of the fastener element but rather simultaneously also about the axis of inclination 42, which is defined by the inclined position of the tool 26'.

A fourth method in accordance with the invention and a further fourth apparatus in accordance with the invention for the attachment of the fastener element, which has already been described in detail in connection with the FIGS. 1A and 1B are illustrated in FIGS. 4A and 4B. In the description of FIGS. 4A and 4B the same reference numerals will be used for parts as were previously used for corresponding parts or parts having the same function. It will be understood that the same description applies for these parts, as for the corresponding parts of the embodiments, unless something is expressed to the contrary.

This fourth embodiment is characterized in that the first tool 26" is formed as a cylindrical intermediate piece which operates on the component in the region of the fastener element and in that a third tool 70 exerts the local force K on the first tool 26".

The first tool 26" and a front section 72 of the third tool facing this cylindrical intermediate piece are guided by a tubular guide part 54 with some radial clearance. The end face 74 of the third tool 70 facing the component has a conical shape and an at least substantially linear contact 76 with the side of the first tool 26" remote from the component.

Any features providing security against rotation which are provided or formed on the fastener element, for example in the region of the contact surface and/or at the transition from the shaft part into the contact surface are also brought into engagement with the component 13 here during the re-shaping movement.

Here the possibility also exists of not only rotating the third tool 70 about the axis of symmetry 18 of the fastener element but rather simultaneously also about the axis of inclination 42 which is defined by the inclined position of the second tool 40.

A further variant of the method of the invention and of the apparatus of the invention is shown in FIGS. 5A and 5B. The fastener element 12' here is a nut element, with the thread being formed as a threaded bore 15' of the fastener element and optionally being able to be arranged in the head part 14. The method can in this embodiment, as also in the later embodiments in accordance with FIGS. 6A, 6B; 7A, 7B; and 8A, 8B be carried out with a holed or non-holed component 513'.

In the subsequent description of the further embodiments the same reference numerals will be used for parts which have the same function as parts in the first four embodiments and it will be understood that the previous description applies in analogous manner to these parts. As is evident the four further embodiments in accordance with the Figures which have yet to be described can be understood almost identically to the first four embodiments so long as one takes account of the fact that they relate to a nut element instead of a bolt element, with the nut element being designed differently than the bolt element, above all in the region of the attachment to the sheet metal part. The element shown here is an RSU element as recited above. Other than in the embodiment in accordance with the further Figures it is however also possible for the component to be a non-holed component which is pierced during the attachment of the nut element. Nonetheless the nut element can also be used with a pre-holed component and indeed with a pre-holed component which is provided with a ring collar such as 35 in accordance with the previous Figures.

The nut element in all the following examples is an RSU element as recited above. In accordance with this the fastener element 12 has, in the head part 14, radially inside an at least substantially ring-like contact surface 22, a recess 80 with at least one radial undercut, for example a ring-like undercut or preferably (as realized in the actual RSU element) with discrete undercuts 82 formed locally at a wall of the cut-out, with which corresponding recesses 84 provided locally in the ring-like contact surface 22 are preferably associated. Through the action of the first tool 26''' having the die button shape material of the component is pressed into the undercut(s) 82 and into the recesses 84.

When the component 13 is a pre-holed component the first tool 26''' having the die button shape presses the sheet metal material around the collar of the hole produced by the pre-holing into the cut-out 80.

Alternatively to this, when the component 13 is a pre-holed component with a ring collar 35 which surrounds the hole produced by the pre-holing and which is introduced into the cut-out 80, the first tool 26''' having the die button shape presses the sheet metal material in the region of the ring collar 80 into the undercuts 82.

The tool 26''' having the die button shape presses the material of the component also into the recesses 84 provided locally in the ring-like contact surface.

For the above described purposes the first tool 26''' having a die button shaped has a central, tubular, optionally conically shaped projection 86 which presses the material of the component radially outwardly into the undercut(s) 82 and optionally into the cut-out 80 or into the recesses 84.

The piercing of the sheet metal component takes place in the subsequently described embodiments in that the component is a non-holed component and the tool which receives the fastener element 12, i.e. the second tool has a pin 90 disposed concentric to the fastener element which passes through the bore 92 of the fastener element 12' and the free end of which 94 cooperates with the hollow first tool 26''' having the die button shape in order to cut out a slug 96 from the component 13' with the slug being disposed of through the central bore 92 of the tool 26''' having the die button shape. The shaft 90 can be realized as a preceding punch which is used to hole the sheet metal part before the start of the wobble movement to shape the sheet metal material around the hole into the recess of the element.

The force which is required to actuate the punch is relatively low and can easily be screwed on in the form of the effect of a manual lever press which is provided for the movement of the pin 90. For example, in a conventional press a force of approximately 400 kgf is necessary on the use of an RSU element in the M6 size with a sheet metal part of 0.8 mm thickness in order to cut a slug out of the sheet metal part, whereas a force of approximately 6,000 kfg is required to shape the sheet metal material around the hole into the recess. The cutting out of the hole in the sheet metal part is therefore unproblematic, and indeed even if an apparatus of low weight is used to shape the sheet metal material around the hole into the recess in accordance with the present teaching.

The aforesaid considerations apply to all variants in accordance with the present teaching in which a punch is used to form a hole in the sheet metal part before the fastener element is attached to the sheet metal part. The pin or punch can also contribute to the centering of the element, but should have sufficient free space with respect to the bore of the element in order not to hinder the wobble movement of the element.

In the embodiment of FIGS. 5A and 5B the first tool 26''' having the die button shape is a normal die button for the attachment of an RSU element. The local force K is exerted onto the head part of the fastener element with the second tool which is disposed in an inclined position 42 related to the axis of symmetry 18 and is rotated about the axis of symmetry The second tool 40' has a conical face 98 which faces the head part 14 of the fastener element 12' and a conical end face 99. In this embodiment the second tool 40' operates directly on the head part 14 of the fastener element 12.

As an alternative to this the second tool 70' can operate in accordance with the embodiment of FIGS. 6A and 6B via a cylindrical immediate piece 50 on the head part 14 of the fastener element 12'.

As previously the cylindrical intermediate piece 50 and a front section 72 of the second tool 70 facing the cylindrical intermediate piece can be guided by a tubular guide part 54 with some radial clearance. The end face 74 of the second tool 70 facing the head part 14 of the fastener element 12' has an at least substantially linear contact 76 with the cylindrical intermediate piece 50. Here also the cylindrical intermediate piece 50 operates on a ring surface 14' of the head part of the fastener element.

In the next embodiment in accordance with FIGS. 7A and 7B the head part 14 of the fastener element 12' is received in a cut-out 60' of a tool 62', the end face 64' of which supports the component 13' at least substantially at the level of the contact surface 22'. The first tool 26'''', which exerts the local force K onto the component 13' is disposed in an inclined position 42 radial to the axis of symmetry 18 and is rotated about the axis of symmetry 18. Here the first tool 26'''' operates directly on the component 13' in the region of the fastener element 12'.

In the last embodiment in accordance with FIGS. 8A and 8B the first tool 26'''' having the die button shape is formed as a cylindrical intermediate piece which operates on the component 13' in the region of a fastener element 12'. The tool 70' exerts the local force K onto the first tool 26''''.

Here also the first tool 26'''' and a front section 72' of the tool 70' facing it are guided by a tubular guide part 54' with some radial clearance.

Furthermore, the end face 76' of the first tool which faces the component also has an at least substantially linear contact with the first tool 26''''. The tool 70' has for this purpose a conical end face facing the head part of the fastener element.

In all the embodiments the fastener element can have features providing security against rotation in the region of the contact surface and/or of the transition from the contact surface into any shaft part and/or in the region of a hollow recess of the fastener element, with the material of the component also being brought into engagement with the features providing security against rotation by the action of the local force and the feed movement, with the features providing security against rotation optionally also being able to be realized by the at least one undercut or by recesses in the contact surface.

Finally it should be pointed out that all steel or aluminum or magnesium sheet metal parts can be considered for the sheet metal part which have deep drawing qualities, whereas somewhat firmer materials are used for the fastener element.

In all embodiments all materials can be named as an example for the material of the fastener elements which achieve strength values of class 8 or higher in accordance with the ISO standard in the context of cold deformation, for example a 35B2 alloy in accordance with DIN 1654. The thus formed fastener elements are suitable amongst other things for all commercially available steel materials for drawing quality sheet metal parts as also for aluminum or its alloys. Aluminum alloys, in particular those with higher strength, can also be used for the functional elements, for example AlMg5. Functional elements of higher strength magnesium alloys such as for example AM50 can also be considered.

The invention claimed is:

1. System comprising an apparatus for the attachment of a fastener element (12; 12') to a sheet metal part (13) having a pre-formed hole and a ring collar (35) surrounding said pre-formed hole, wherein the fastener element has an axis of symmetry (18), a head part (14) having a contact surface (22) which enters into contact with the sheet metal part (13), a fastening section having a thread (15; 15') and also at least one undercut (24; 82) which receives the material of the sheet metal part, with the thread (15) being formed at a shaft part (16) of the fastener element and wherein the shaft part (16) can be guided through the pre-formed hole of the sheet metal part, wherein the material of the sheet metal part can he pressed against the contact surface and into the undercut by means of a first tool (26') and a second tool (62), said first tool having a die button shape, a first aperture accommodating said shaft part with clearance and a central ring projection (36) with an at least substantially conical inner surface (38) adapted to press the material of said ring collar (35) radially inwardly into the undercut (24), said second tool (62) having a cut-out (60) receiving said head part (14) of said fastener element (12), an end face (64) which supports the sheet metal part (13) at least substantially at least at the level of said contact surface (22) wherein the apparatus has a device generating a force adapted to exert a local force (K) onto said first tool (26') to the side of the axis of symmetry (18) and to move this local force circularly around the axis of symmetry (arrow 43) while simultaneously carrying out a relative feed movement (arrow 28) between said first tool (26') and the fastener element (12; 12') between which the sheet metal part (13) is arranged and wherein the local force (K) can be exerted onto the sheet metal part (13), with the first tool (26') which is disposed at an inclined position (42, 42') relative to the axis of symmetry (18) and being rotatable about the axis of symmetry in order to press the material of the sheet metal part onto the contact surface and into the undercut (24; 82) while said fastener element (12, 12') is supported in said second tool (62).

2. System in accordance with claim 1, wherein the fastener element is a bolt element (l2).

3. System in accordance with claim 1, wherein the first tool works directly on the sheet metal part (13) in the region of the fastener element (12).

4. System in accordance with claim 1, wherein the fastener element (12) has an axial ring groove (34) or concave fields in the contact surface and also a radial undercut (24) which can be formed by the thread (15) in the region of the head part (14); wherein the metal sheet part has a hole with a collar surrounding the hole; and in that the fastener element (12) can be passed through the ring collar (35) surrounding the hole from the side of the metal sheet part (13) remote from the ring collar (35).

5. System in accordance with claim 1, wherein the fastener element (12; 12') has features (84) providing security against rotation in the region of the contact surface and/or of the transition from the contact surface into any shaft part that is present and/or in the region of a hollow recess (80) of the fastener element, wherein the material of the sheet metal part can also be brought by the action of the local force (K) and the feed movement into engagement with the features providing security against rotation.

6. System in accordance with claim 1, wherein it is incorporated into a type of drill press in order to achieve the relative movements.

7. System in accordance with claim 5, wherein said security against rotation can be realized by the at least one undercut (24; 82) or by recesses (84) in the contact surface (22).

* * * * *